(No Model.) 2 Sheets—Sheet 2.
J. S. BLANKMAN.
DISTANCE MEASURING MACHINE.
No. 435,201. Patented Aug. 26, 1890.
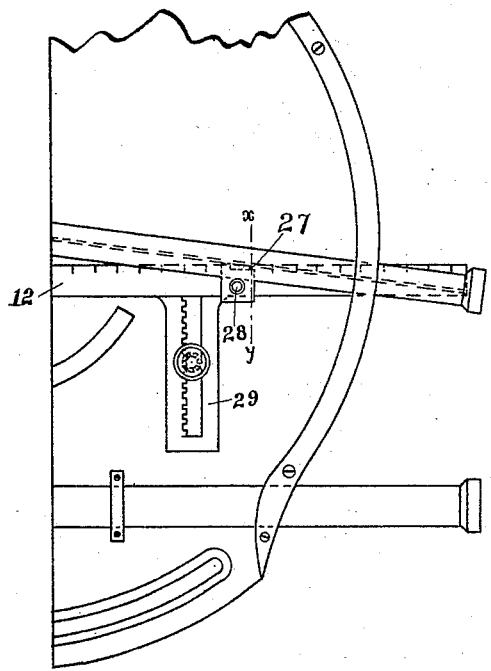
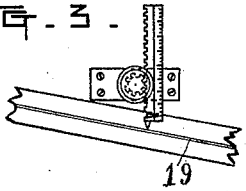
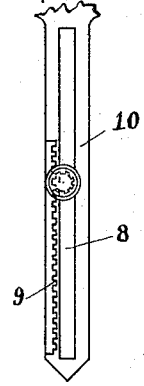
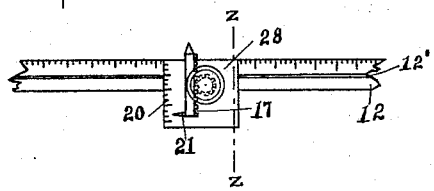
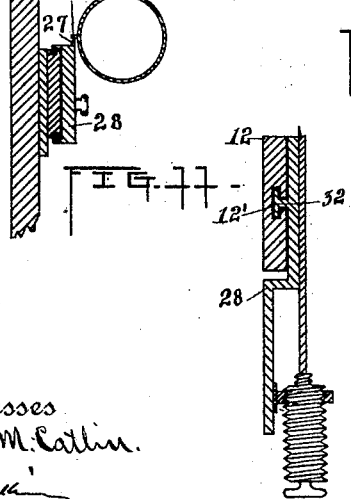
Witnesses
Archie M. Catlin.
E. Hopkins
Inventor
John S. Blankman
By his Attorney
Benj. R. Catlin

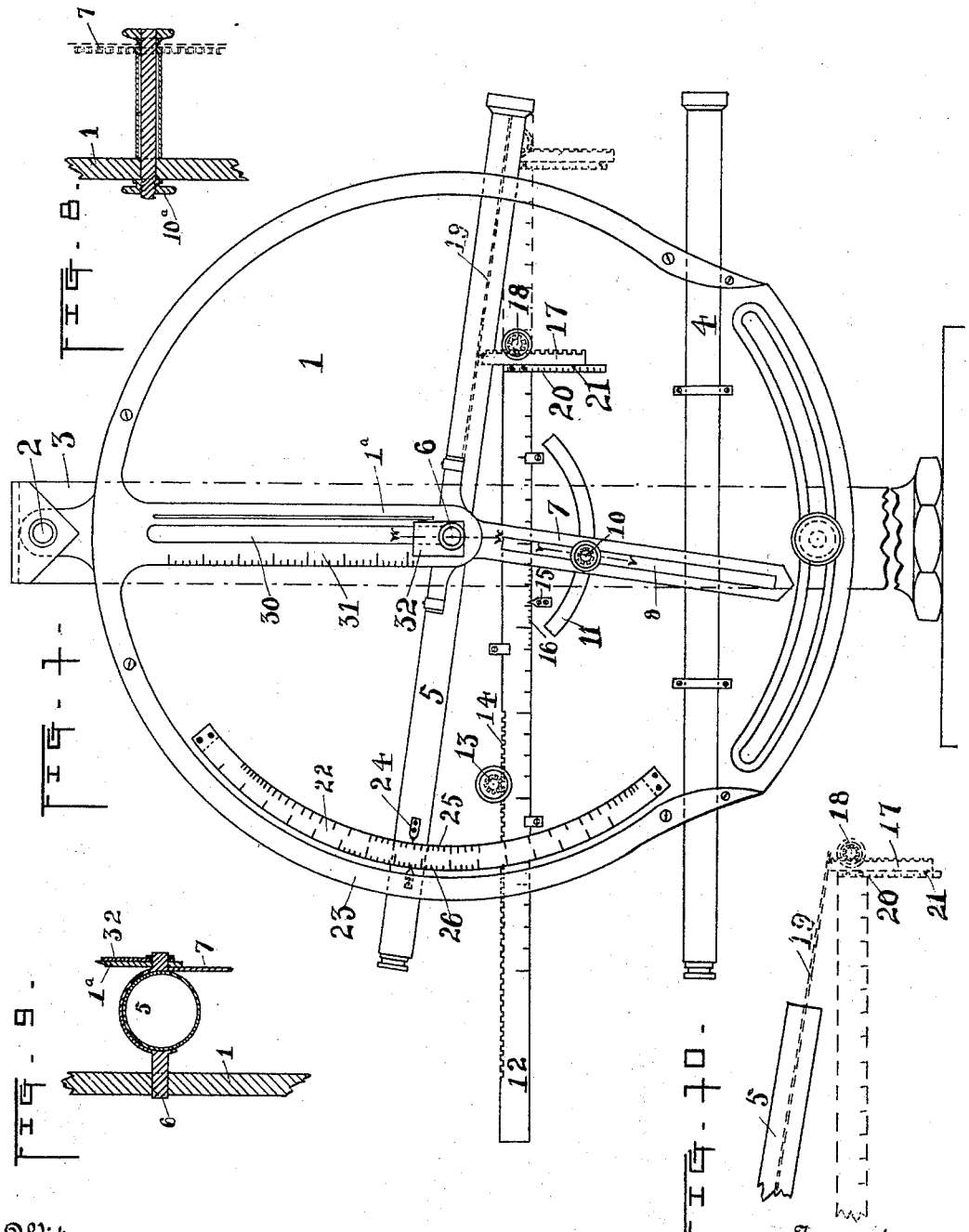

UNITED STATES PATENT OFFICE.

JOHN S. BLANKMAN, OF WASHINGTON, DISTRICT OF COLUMBIA.

DISTANCE-MEASURING MACHINE.

SPECIFICATION forming part of Letters Patent No. 435,201, dated August 26, 1890.

Application filed March 25, 1890. Serial No. 345,199. (No model.)

*To all whom it may concern:*

Be it known that I, JOHN S. BLANKMAN, a citizen of the United States, residing at Washington, in the District of Columbia, have invented certain new and useful Improvements in Distance-Measuring Machines; and I do hereby declare the following to be a full, clear, and exact description of the invention, such as will enable others skilled in the art to which it appertains to make and use the same.

The object of the invention is to provide means for indicating the distance of remote objects, and it embraces improvements upon devices claimed in my application for instrument for indicating distances, filed January 11, 1890, and serially numbered 336,613; and it consists in the devices and combinations hereinafter described and pointed out.

In the accompanying drawings, Figure 1 is an elevation of an instrument embodying the main part of the invention. Fig. 2 is a similar view of a modification, a portion only of the instrument being shown. Fig. 3 is a partial view of a modification. Fig. 4 is a rear view of a section of the telescope-plate extension. Fig. 5 is a partial section on line $x$ $y$ of Fig. 2. Fig. 6 is an elevation of a sliding plate, scale-bar, and vertically and horizontally adjustable pointer. Fig. 7 is a partial section on line $z$ $z$ of Fig. 6. Fig. 8 is a partial section on line $v$ $v$ of Fig. 1. Fig. 9 is a partial section on line $w$ $w$ of Fig. 1. Fig. 10 is a partial elevation of a telescope, showing an extension of telescope-rib and scale-bar, and Fig. 11 is an elevation of a modification.

A main plate or frame 1 is suspended at 2 from a post or like supporting device 3, and carries in the present instance two telescopes 4 and 5. The former is fixed in position on plate 1, while the latter is supported between plate 1 and a plate or bracket 1ª by means of trunnions 6, whose axial line prolonged would pass through the axis of the telescope. One trunnion is journaled in the bracket and one in the main plate, and either may be provided with a screw-threaded extension and a set-nut. The supplemental plate or bracket 1ª, as shown, is made continuous with a curved plate arranged parallel to the edge of the main plate, and held at a suitable distance from it by stay-bolts or other means.

It will be understood that the telescope 5 is supported between plate 1 on the one side and plate 1ª and the above-described circumferential plate on the other.

Numeral 7 is a bar or plate rigidly secured to the telescope near its journals, and it is provided with a slot 8 and a rack 9. (See Fig. 4.) With this rack is geared a pinion 10, which can be used to raise and lower the telescope, together with bar 7. A curved slot 11, having the axis of the trunnion 6 as its center, is provided in plate or frame 1, and the stem of pinion 10 passes through it, and is provided on its rear end with a screw-thread and nut 10ª, the construction being such that the telescope can be tilted by moving the bar 7, which bar can be clamped in any desired position by the thumb-nut 10ª on the screw.

12 denotes a scale-bar supported by brackets or otherwise on plate 1, and 13 is a pinion engaging a rack 14 on said bar for moving it in either direction.

15 is a pointer, and 16 a scale, whereby the extent of the movement is indicated. This pointer may be placed at any convenient part of the scale, being suitably marked.

17 is a rack-bar secured on the end of the bar 12 by suitable brackets. It has a rack upon one side with which a pinion 12 gears, which pinion has on its stem a milled head, whereby the bar 17 can be raised or lowered. The pinion is journaled in brackets attached to the end of the bar 12. The upper extremity of the rack is arranged in the same vertical plane with a rib or bar 19, attached to the telescope on the rear side, and whose lower edge is in the same plane as the axial lines of the telescope and its trunnions.

20 is a scale fixed to the bar 12, and 21 is a pointer for the same extending laterally from the bar 17. This pointer indicates on scale 20 the extent of the vertical movement of said bar.

22 denotes a curved plate having the pivot 6 as a center and provided with a scale of angles on its exterior and on its interior with a scale 25, intended to be marked to represent the bases of triangles similar to the triangles hereinafter described.

23 is a pointer for the first-named scale, and a pointer for the other scale 25 is denoted by 24.

The operation of the above-described instrument is as follows: The main plate is moved about its point of support 2 until an object whose distance it is desired to ascertain is visible through the lower telescope, which latter, as well as the upper one, may be provided with crossed wires of usual construction and supplied with magnifying-glasses, or not, as found convenient. After the lower telescope has been directed as stated the plate 1 is clamped to its support and the upper telescope is then directed also to the same object. The bar 12 having been suitably graduated and arranged, as will be more particularly explained, is next moved to bring the upper end or point of the rack 17 in contact with the rib 19, which for the purposes of this invention may be considered as coincident with the axis of the telescope. The distance through which bar 12 is moved from its initial position is denoted on scale 16 by the pointer 15.

The above-described operation defines a triangle whose altitude is the vertical distance between the axis of the telescopes whose base is the line of sight to the object through the lower telescope equivalent to a parallel line on the plate or a base-line, and whose hypotenuse is the line of sight to the same object through the upper telescope. This triangle is similar to a small one which may be conceived to be cut off near its apex by a line parallel to the base-line or axis of the lower telescope, and the scale 16 is so graduated that its lateral movement to bring bar 17 in contact with rib 19 indicates the length of the base of said small triangle, whose height is fixed or assumed when the scale is marked.

For the above-described operation the bar 17 should have an initial position, such that its upper point has a distance below the apex of the larger triangle equal to the altitude of the similar small triangle above mentioned.

Having thus the ratio between the height and base of the small triangle, and having the height of the larger triangle, the base of the latter can be calculated, and this is the required distance. It is immaterial whether or not the distances sought corresponds to certain degrees or divisions of scale 16, or of other scales are marked thereon. If not so marked, they can be calculated as occasion requires. It may be noted that the small triangle above assumed to be formed at the apex of the larger triangle defined by the telescopes, as specified, and similar to said larger triangle, need not actually be defined or bounded by the instrument, it being only requisite to mark the base of the assumed small similar triangle with equal divisions or degrees. Obviously each equal part of this scale will represent the same proportioned distance on the base—that is, on the prolonged axis of the lower telescope. It is therefore only necessary to indicate on the scale degrees or divisions proportioned to the various distances sought to be determined on the base-line to furnish the means for calculating said distance; and it is also immaterial where the scale is placed or where the pointer is located, if said pointer is moved over the scale proportionally to various distances on the base-line, nor is it material where the small similar triangle whose base is used as a scale-line is assumed to be formed or located, provided only a pointer be provided to indicate parts proportional to distances of the various points where the axes of the two telescopes may intersect. Thus the rib 19, the upper part of bar 17, and the scale-bar 12 define a triangle similar to that defined by the telescopes, as above explained, and its base could, if desired, be referred to as a scale-line.

It would be practicable to make the upper telescope vertically adjustable, and by it to do the work of the two herein described, and in respect to a part of the invention it is immaterial whether one or two be used, it being only important to properly direct a base-line, which may be indicated on the plate, if desired, parallel to the axis of the lower telescope and practically coincident with it.

The bar 12 being made laterally movable, can, if desired, be extended beyond the longest telescope, and the bar or rib 19 can also be prolonged beyond the telescope, as indicated in Fig. 10, and such extensions used for long distances, the effect being to prolong the scale of bases or the line on which said bases are marked, and thereby increase the capacity of the instrument.

It being understood that the scale-bar 12 has been marked to denote the bases of triangles having a small altitude and similar to the triangle defined by the telescopes as above set forth, it will also be understood that the extended scale-bar and telescope-rib can be used to indicate longer distances and the extensions thereafter dispensed with, if desired, they having served the purpose of marking the scale 25 empirically, than would be practicable without such extension, and that scale 25 on the plate 22 can be thereby experimentally marked for said distances. Scale 25, having been properly marked in any desired manner, can be used for ascertaining distances upon properly directing the telescopes and reading the scale 25, which, being marked on an arc considerably removed from pivot 6, will have comparatively large degrees. The said scale can be marked by any convenient means, so that its degrees shall have a known ratio to distances on the base-line. For example, the telescope could be directed successively to mile-posts on a railroad-track and the scale 25 suitably marked, which marks would thereafter correspond under like circumstances to equal distances. It will of course be understood that scale 25 is used for but one altitude of the upper telescope pivots. The arc scale 26 and pointer 23 indicate the angular movement of the telescope, as will be understood.

The bar 17 and its pinion could be made sufficiently strong to raise the telescope and turn it on its trunnions. They could be arranged on the upper side of the telescope, as indicated in Fig. 3, in which case the rack and pinion could be used to tilt the telescope in a downward direction. They can also be supported upon or secured directly to the main plate.

A pointer 27, attached to a sliding plate 28, (see Figs. 2 and 5,) may be used for some of the purposes of this improvement. The plate 28 is made to embrace the bar by means of flanges bent over the same and is adapted to be slid along upon the bar. Its pointer 27 can be first moved to a mark on bar 12 corresponding to a known distance, and the telescope tilted until its rib 19 rests upon pointer 27, when the distance of the object intercepted on the line of the lower telescope is known; or both telescopes can be directed to an object of unknown distance, as before described, and the plate slid along on bar 12 until the pointer 27 touches the telescope-rib, whereupon the distance of the object is ascertained by looking at the mark pointed out on the scale. It will be seen that the sliding-plate pointer is to some extent an equivalent for the sliding bar.

In Fig. 6 is illustrated a sliding-plate pointer having a vertical scale 20, and a lateral pointer 21 for the same, which is carried by the rack 17, said rack being vertically movable by means of a rack and pinion, or by a differential screw or equivalent.

Plate 28 may be connected with bar 12 by the axis of pinion 18 passing through a slot 12' in the bar, or in any convenient manner that will permit it to be moved lengthwise of said bar.

The scale on bar 12 and its pointer can be used as before set forth—that is, to indicate the base of a small triangle similar to a larger triangle whose base is a prolongation of the axis of the lower telescope, (if such instrument be used,) and whose length is for the present assumed to be known. The pointer 17 is in the above case in contact with the rib 19 where it intercepts the base of the small triangle. It is now only necessary to elevate the pointer and rib, keeping them in contact to indicate a new triangle having the same altitude as the small one just before defined, but having a base proportionately increased. If the pointer and rib were raised one-fourth the altitude of the said small triangle, the new triangle thus indicated would have a base whose length as compared with the base of the first-named small triangle would be as two to three; or if the pointer and rib be raised one-half the altitude of the first triangle the bases will be as one to two, and proportional changes will occur in the distances intercepted on the base-line (or the prolonged axis of the lower telescope) by the line of sight through the upper telescope; or, in brief, having defined a small triangle similar to a large one, the length of whose base is known, other small triangles of increased dimensions can be indicated by raising the pointer 17, any one of which new triangles will have parts proportioned to a large triangle whose base is in the base-line or line of sight of the lower telescope. Preferably this sliding plate 28 is provided with a pointer 17, (see Fig. 6,) and has a sliding connection with the scale-bar, as indicated in Fig. 7, in which 12' indicates a slot in the bar and 32 a stud fixed to the plate arranged to slide in said slot. A rack and pinion can be used for moving this plate 28 on the scale-bar, if desired.

The sliding scale-plate provided with a vertically-movable bar having a pointer could be connected directly to the main frame by a slot and stud or arm, substantially such as shown in Fig. 7, or by rack and pinion, and the operation of these parts would not be materially affected thereby, except that the horizontal scale could not be extended by moving a scale-bar.

It will be understood that the pointer 21 can be used with the scale on 12 to its full extent, (or a part thereof,) said scale having been marked to denote the bases of certain triangles, as elsewhere herein explained, and that then the vertical scale can be used, the rack 17 being moved vertically by differential screw rack and pinion or by any suitab means, according as the telescope is directed to more distant objects. To illustrate the operation of these two scales, let the altitude of the supposed series of triangles be one-eighth of an inch, and let the altitude of the large triangle, to which it is made similar, be assumed to be five feet, then the entire length of the scale proportional to two hundred and twenty yards will be sixteen and one-half inches. Then if the line of sight through the telescope crossed the scale at its farther end it would strike the prolongation of the base-line at a distance of two hundred and twenty yards. If now the telescope be tilted or raised one thirty-second of an inch the line of sight would strike the base-line at three hundred and thirty yards; or if the telescope be raised one-sixteenth of an inch the line of sight would strike the base-line at four hundred and forty yards, according to the properties of similar triangles, from which it will be readily understood that the capacity of the instrument with a given horizontal scale may be much enlarged by the use of the vertical scale.

To adapt scale-bar 12 for use at different distances from the pivot of the telescope—that is, from the apex of the described triangle whereby different scales placed upon said bar corresponding to supposed series of triangles, each series having a different altitude, may be used—I attach to it a vertically-slotted extension or bar 29, as indicated in Fig. 2. This slotted bar being provided with a rack and pinion and a set-screw, such as indicated in Fig. 2, the plate and bar can be moved up and down as desired. If now the bar be marked with scales to denote the bases of series of triangles similar to the described triangle, each series having a different altitude, the bar can be moved at will to the vertical position corresponding to a particular series and the scale appropriate to that position or altitude can be employed.

The supplemental plate 1 is slotted at 30 above the bearings of the telescope-trunnions to permit the telescope to be raised. When, therefore, the telescopes have been adjusted to bear upon a point at a known distance, the upper telescope can be subsequently raised, and its angle of inclination to the lower telescope being unchanged it will be directed to a more remote point whose distance will be proportional to the increased altitude of the telescope. The altitudes are indicated on a scale 31 by the corner or edge of a sliding plate 32 to the telescope.

I have in my application, Serial No. 342,202 filed March 1, 1890, described an instrument provided with a single telescope supported on an index-plate pivotally connected to a main or scale plate, being provided with a vertically-arranged pointer horizontally movable and adapted to bear on the edge of the index-plate and thereby indicate the point at which said edge crosses a scale, and such matters are not of the gist of the present invention.

Having thus described my invention, what I desire to claim and secure by Letters Patent is—

1. In combination with the main plate or frame, the pivoted telescope and the longitudinally-adjustable scale-bar located near the telescope-support and arranged parallel with the base-line, substantially as set forth.

2. In combination with the main plate or frame, the pivoted telescope and the vertically-adjustable scale-bar located near the telescope-support and arranged parallel with the base-line.

3. In combination with the main plate, pivoted telescope and scale-bar, a plate carrying a pointer movable lengthwise on the bar, substantially as set forth.

4. In combination with the main plate, pivoted telescope, and horizontal scale, a plate carrying a vertical scale, a pointer movable lengthwise along the scale, and means for raising the pointer, substantially as set forth.

5. In combination with the main plate, pivoted telescope, and horizontal scale, a plate having thereon a vertical scale, and a vertically-adjustable pointer or bar adapted to denote degrees on the horizontal scale and to be moved above the same against the telescope, and a pointer for indicating the extent of such movement, substantially as set forth.

6. In combination with the pivoted telescope provided with an exterior rib arranged parallel to its axis, a vertically-adjustable pointer and a scale adjacent to the pointer, substantially as set forth.

7. In combination with the pivoted telescope and longitudinally-adjustable scale-bar, the vertically-adjustable pointer, substantially as set forth.

8. In combination, the main plate or frame and the parallel supplemental plate, each provided with a vertical slot, the telescope pivotally supported in the same, and a rack and pinion for raising and lowering the telescope, substantially as set forth.

9. In combination with the main plate or frame, a subsidiary frame provided with a scale arranged parallel thereto, a telescope pivoted between the planes of the two frames, and a pointer on the telescope arranged to move over the scale, substantially as set forth.

10. In combination with the main plate or frame and pivoted telescope, a subsidiary frame provided with a scale arranged parallel thereto and concentric with the telescope-pivot and provided with a scale of angles and a scale of triangle bases and a pointer for each carried on the telescope.

11. In combination, a supporting plate or frame, a pivoted telescope, a horizontal scale arranged near the telescope-pivot, means for indicating the point at which the telescope crosses said scale, a scale of vertical distances, and means for indicating the vertical movements of the telescope on said latter scale, substantially as set forth.

In testimony whereof I have affixed my signature in presence of two witnesses.

JOHN S. BLANKMAN.

Witnesses:
ARCHIE M. CATLIN,
S. G. HOPKINS.